(12) United States Patent
Fiveland et al.

(10) Patent No.: US 9,133,808 B2
(45) Date of Patent: Sep. 15, 2015

(54) FUEL INJECTION SYSTEM AND METHOD FOR A COMBUSTION ENGINE

(71) Applicant: Caterpillar Inc., Peoria, IL (US)

(72) Inventors: Scott Fiveland, Metonna, IL (US); David Montgomery, Edelstein, IL (US); Alan Stockner, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 222 days.

(21) Appl. No.: 13/775,735

(22) Filed: Feb. 25, 2013

(65) Prior Publication Data

US 2014/0238350 A1    Aug. 28, 2014

(51) Int. Cl.
*F02M 69/04*    (2006.01)

(52) U.S. Cl.
CPC .................... *F02M 69/04* (2013.01)

(58) Field of Classification Search
CPC ............ F02M 21/0275; F02M 59/105; F02M 2700/1335; F02M 21/0281; F02M 57/02; F02B 43/00
USPC ....... 123/27 GE, 90.55, 299, 525, 90.11, 275, 123/304, 526, 527, 445, 184.47, 528, 529; 239/533.12, 88, 89, 90, 91, 92, 93, 94, 239/95, 533.7, 533.8
See application file for complete search history.

(56) References Cited

U.S. PATENT DOCUMENTS

| | | | |
|---|---|---|---|
| 1,664,782 A * | 4/1928 | Magdeburger | 123/61 R |
| 4,034,917 A * | 7/1977 | Bailey | 239/453 |
| 4,539,948 A | 9/1985 | Toepel | |
| 5,271,371 A | 12/1993 | Meints et al. | |
| 5,456,222 A | 10/1995 | Schechter | |
| 5,632,253 A * | 5/1997 | Paul et al. | 123/531 |
| 5,996,558 A | 12/1999 | Ouellette et al. | |
| 6,298,833 B1 | 10/2001 | Douville et al. | |
| 6,409,096 B2 * | 6/2002 | Popp | 239/124 |
| 6,604,695 B1 * | 8/2003 | Parish | 239/533.2 |
| 7,162,994 B2 | 1/2007 | Li et al. | |
| 7,370,627 B2 | 5/2008 | Mahakul et al. | |
| 8,382,006 B2 * | 2/2013 | Gebhardt et al. | 239/88 |
| 2003/0084870 A1 * | 5/2003 | Parrish | 123/305 |
| 2003/0201344 A1 * | 10/2003 | Wark | 239/533.8 |
| 2012/0187218 A1 | 7/2012 | Kim et al. | |
| 2012/0216773 A1 * | 8/2012 | Brewster et al. | 123/299 |
| 2014/0116388 A1 * | 5/2014 | Foege et al. | 123/456 |

FOREIGN PATENT DOCUMENTS

| | | | | |
|---|---|---|---|---|
| CA | 2743043 A1 | 8/2011 | | |
| GB | 527873 A | * 10/1940 | | F02B 7/02 |
| JP | 2001-280172 A | 10/2001 | | |

* cited by examiner

*Primary Examiner* — Lindsay Low
*Assistant Examiner* — Garrett M Hausman
(74) *Attorney, Agent, or Firm* — BakerHostetler

(57) ABSTRACT

Apparatus and methods for injecting gaseous fuel into a compression ignition engine are disclosed. A gaseous fuel injector includes a pintle valve and an intensifier. The pintle valve includes a pintle body defining a pintle bore therethrough, a first sealing surface disposed on a distal end of the pintle body, and a pintle disposed within the pintle bore. The pintle includes a shaft, a radially flared portion, and a second sealing surface disposed on a proximal face of the radially flared portion, such that the first sealing surface faces the second sealing surface. The intensifier includes an intensifier body defining a fuel pump chamber therein, the fuel pump chamber being fluidly coupled to a gaseous fuel supply and the pintle bore, a plunger having a distal end disposed in the fuel pump chamber, and an intensifier piston disposed on a proximal end of the plunger.

19 Claims, 10 Drawing Sheets

FUEL INJECTION SYSTEM AND METHOD FOR A COMBUSTION ENGINE

TECHNICAL FIELD

The present disclosure relates generally to reciprocating combustion engines. More particularly, the present disclosure relates to gaseous fuel injection for a reciprocating combustion engine.

BACKGROUND

Reciprocating combustion engines are known for converting chemical energy from a fuel source into rotating shaft power. In reciprocating engines, air is compressed within a cylinder volume defined by a piston, an inner cylinder wall, and a cylinder head, thereby increasing both the pressure and temperature of the air. In spark ignition engines, fuel and air are premixed upstream of the cylinder volume or within the cylinder volume, such that ignition of the premixed fuel and air is initiated by arcing an electrical spark across a gap within the cylinder volume. In compression ignition engines, a fuel-air mixture within the cylinder volume autoignites in response to the local temperature and pressure within the volume. More particularly, in direct injection compression ignition engines, fuel is injected into the cylinder volume near the peak of the compression cycle and ignition of the fuel and air occurs after a short autoignition delay time. Heat released from combustion of the fuel-air mixture does work against the piston, which conventionally transfers the work to a rotating crankshaft through a connecting rod.

Canadian patent number 2743043 (hereinafter "the '043 patent") describes a dual fuel injection valve for direct injection of two different fuels into a combustion chamber of an internal combustion engine. The '043 patent states that a first fuel can be selected from a group of combustible gases including natural gas, hydrogen, and propane, and that a second pilot fuel can be selected from a group of combustible liquids including diesel fuel, dimethylether, and bio-diesel.

The '043 patent describes high pressure direct injection (HPDI) of the first fuel near top dead center of a piston compression stroke. In turn, the supply pressure of the first fuel must be in excess of the cylinder pressure at the time of injection to effect direct injection of the first fuel. However, on-vehicle storage of fuels at such high pressures or on-vehicle compression of gaseous fuels to such high pressures is difficult and expensive.

Further, injecting the first (gaseous) fuel near the top of the compression stroke, as described in the '043 patent, may not allow sufficient time for mixing with air inside the cylinder, which can be problematic for ignition. For example, injecting the second fuel into a region of largely unmixed first fuel could inhibit ignition by shielding the second fuel from oxygen. Moreover, ignition of the second fuel may not effect ignition of the first fuel if the first injection and the second injection are separated by a region of air largely devoid of either fuel.

Accordingly, apparatus and methods for injecting gaseous fuel into a compression ignition engine with improved fuel-air mixing and with reduced storage and delivery pressure requirements are desired.

SUMMARY

In one embodiment of the present disclosure a gaseous fuel injector comprises a pintle valve and an intensifier. The pintle valve includes a pintle body defining a pintle bore therethrough, a first sealing surface disposed on a distal end of the pintle body, and a pintle disposed within the pintle bore. The pintle includes a shaft, a radially flared portion disposed at a distal end of the pintle, and a second sealing surface disposed on a proximal face of the radially flared portion, such that the first sealing surface faces the second sealing surface. The intensifier includes an intensifier body defining a fuel pump chamber therein, the fuel pump chamber being fluidly coupled to a gaseous fuel supply and the pintle bore, a plunger having a distal end disposed in the fuel pump chamber, and an intensifier piston disposed on a proximal end of the plunger.

In another embodiment of the present disclosure a combustion engine system comprises an engine cylinder defining a cylinder bore therethrough, and a gaseous fuel injector fluidly coupled to a gaseous fuel supply and the cylinder bore. The gaseous fuel injector includes a pintle valve, and an intensifier. The intensifier includes an intensifier body defining a fuel pump chamber therein, the fuel pump chamber being fluidly coupled to a gaseous fuel supply and the pintle valve, a plunger having a distal end disposed in the fuel pump chamber, and an intensifier piston disposed on a proximal end of the plunger, the intensifier piston being fluidly coupled to a hydraulic fluid supply.

Still yet another embodiment of the present disclosure provides a method of injecting a gaseous fuel into a reciprocating combustion engine including a gaseous fuel injector having a plunger disposed in a fuel pump chamber, an intensifier piston coupled to the plunger, the intensifier piston being fluidly coupled to a hydraulic fluid supply, the fuel pump chamber being fluidly coupled to a gaseous fuel supply, and a pintle valve fluidly coupled to the fuel pump chamber, the method comprising admitting a gaseous fuel from the gaseous fuel supply into the fuel pump chamber; applying a hydraulic pressure from the hydraulic fluid supply to the intensifier piston; translating the plunger within the fuel pump chamber; translating a pintle of the pintle valve away from the gaseous fuel injector; and flowing the gaseous fuel into a cylinder bore of the reciprocating combustion engine through an outlet of the pintle valve.

DETAILED DESCRIPTION

Figure 1:
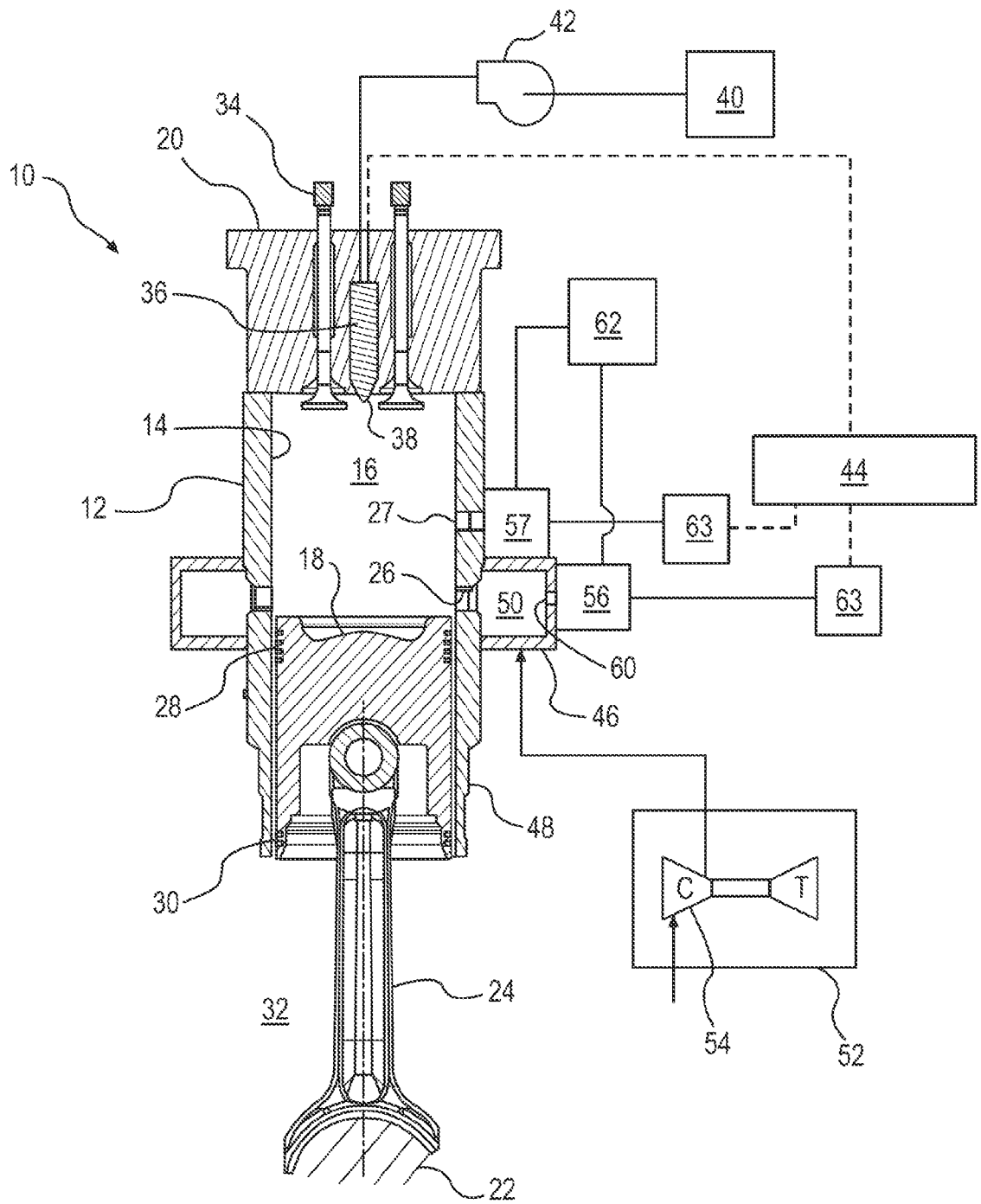
FIG. 1 presents a schematic view illustrating a combustion engine system according to an embodiment of the present disclosure.

FIG. 1 presents a schematic view illustrating a combustion engine system 10 according to an embodiment of the present disclosure.

Engine system 10 includes an engine cylinder 12 with an inner surface 14 that defines a cylinder bore 16 therethrough, a piston 18 slidably disposed within the cylinder bore 16, and a cylinder head 20 disposed on top of the engine cylinder 12. The piston 18 is operably coupled to a crankshaft 22 (shown in part) through a connecting rod 24. Although only one engine cylinder 12 is shown in FIG. 1, the engine system 10 could include a plurality of engine cylinders, as would be appreciated by persons having ordinary skill in the art.

The engine cylinder 12 includes a side port 26 extending through a wall thereof, such that the side port 26 is in fluid communication with the cylinder bore 16. It will be appreciated that the engine cylinder 12 could have any number of side ports 26. The piston 18 may engage the inner surface 14 of the engine cylinder 12 through two sets of seals, including, for example, an upper set of rings 28 (or an upper ring pack) and a lower set of rings 30 (or a lower ring pack).

Figure 2:
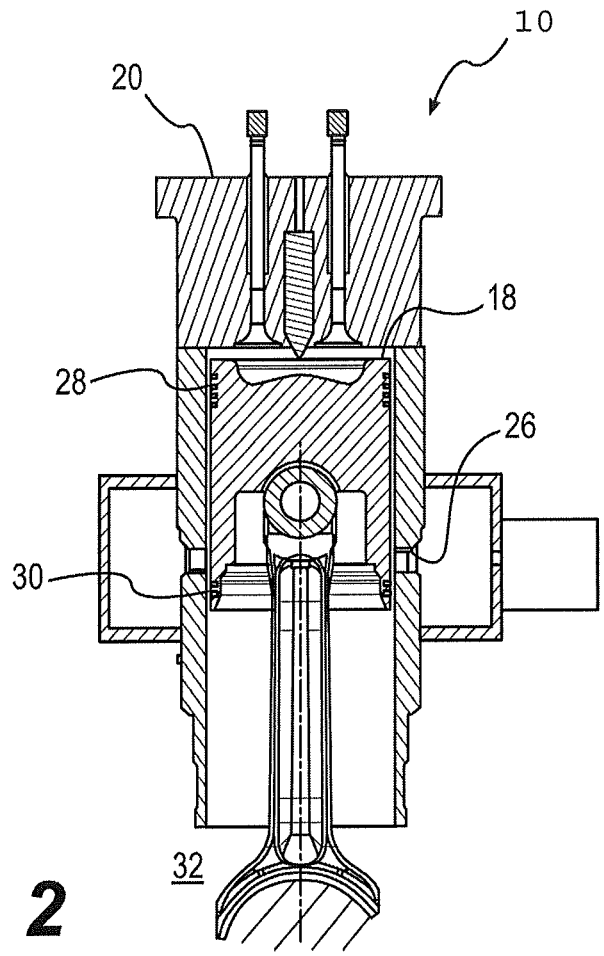
FIG. 2 presents an exemplary view of the combustion engine system in FIG. 1 where the piston is near the top of its stroke within the cylinder bore.

Fluid communication between the side port 26 and the cylinder head 20 via the cylinder bore 16 depends upon the position of the piston 18 within the cylinder bore 16. As shown in FIG. 1, when the piston is near the bottom of its stroke, the side port 26 is in fluid communication with the cylinder head 20 via the cylinder bore 16 when both the upper set of rings 28 and the lower set of rings 30 are disposed below the side port 26. As best shown in FIG. 2, when the piston 18 is near the top of its stroke, the side port 26 is isolated from fluid communication with the cylinder head 20 by the upper set of rings 28, and the side port 26 is isolated from fluid communication with a crankcase 32 of the engine system 10 by the lower set of rings 30.

The cylinder head 20 includes at least one exhaust valve 34 that is actuated by a cam (not shown), hydraulics (not shown), or other means for actuating exhaust valves known by persons with ordinary skill in the art. When the at least one exhaust valve 34 is in an open position, the cylinder bore 16 is in fluid communication with an exhaust manifold (not shown) through the cylinder head 20.

The engine system 10 includes a fuel injector 36 having at least one fuel injection orifice 38 in fluid communication with the cylinder bore 16. The fuel injector 36 is supplied with a fuel that readily autoignites at air pressures and temperatures achieved near the top of the compression stroke of the piston 18 within the cylinder bore 16, such as, for example, diesel fuel, bio-diesel, dimethyl either (DME), kerosene, seed oils, and other fuels with similarly high cetane indices known by persons with ordinary skill in the art.

The fuel injector 36 receives fuel from a fuel supply 40 via a pump 42. The pump 42 may be a unit pump driven by a cam (not shown), a common rail fuel pump, or the like. Alternatively, the fuel injector 36 may be a hydraulically-actuated electronically-controlled (HEUI) unit that includes fuel pumping means within the fuel injector 36 assembly. The timing and rate shape of the fuel injected through fuel injector 36 may be controlled by a cam (not shown), an electronic control module 44 (ECM), or other fuel injector control means known by persons with ordinary skill in the art.

One embodiment of the combustion engine system 10 includes an air jacket 46 disposed around an outer surface 48 of the engine cylinder 12, such that the outer surface 48 of the engine cylinder 12 and the air jacket 46 define an air plenum 50 therebetween. The air plenum 50 may be a continuous annular ring around the engine cylinder 12. Alternatively, the air plenum 50 may extend only partly around the engine cylinder 12.

The air plenum 50 is in fluid communication with the cylinder bore 16 via the side port 26. Further, the air plenum 50 is fluidly coupled to an air supply 52. In one embodiment, the air plenum 50 is fluidly coupled to the outlet of an air compressor 54, which is part of an exhaust-driven turbocharger or a supercharger (not shown). The outlet pressure of the air compressor 54 may vary from about 14.5 psig (100 kPa gauge) to about 43.5 psig (300 kPa gauge).

In one embodiment, the combustion engine system 10 includes a gaseous fuel injector 56 that is fluidly coupled to the air plenum 50. The gaseous fuel injector 56 receives gaseous fuel from a gaseous fuel supply system 62, and an outlet 58 of the gaseous fuel injector 56 may be in fluid communication with the air plenum 50 via an aperture 60 through the air jacket 46. The timing and rate shape of the gaseous fuel injector 56 may be controlled by the ECM 44.

Alternatively, the gaseous fuel injector 56 may be disposed in the cylinder head 20 and have direct fluid communication with the cylinder bore 16. Further, the gaseous fuel injector 56 may also be disposed in an air inlet manifold upstream of an air intake valve (not shown) that is located within the cylinder head 20. Moreover, the gaseous fuel injector 56 may be in fluid communication with the cylinder bore 16 directly through a wall of the engine cylinder 12 via a fuel injection port 27, where the fuel injection port 27 is not in direct fluid communication with the air plenum 50.

In another embodiment of the present disclosure, the engine system 10 includes a second gaseous injector 57 in fluid communication with the cylinder bore 16 through fuel injection port 27 in addition to the gaseous fuel injector 56, which is in fluid communication with the cylinder bore 16 through the air plenum 50 and the side port 26. The second gaseous fuel injector 57 may receive gaseous fuel from the gaseous fuel supply system 62, or alternatively from another gaseous fuel supply system different from the gaseous fuel supply system 62. Further, the ECM 44 may cause the gaseous fuel injector 56 and the second gaseous fuel injector 57 to inject fuel into the cylinder bore 16 at different times, thereby taking advantage of the relative positions, of the side port 26 and fuel injection port 27 with respect to the upper set of rings 28 during a crankshaft revolution. Indeed, the fuel injection port 27 may be in fluid communication with the cylinder bore 16 for a longer duration than the side port 26 if the fuel injection port 27 is located closer to the cylinder head 20 than the side port 26.

The gaseous fuel supply system 62 may include storage tanks, filters, valves, regulators, heaters, chillers, pumps, compressors, instrumentation, or other similar components. The gaseous fuel may include natural gas, propane, ethane, butane, methane, hydrogen, mixtures thereof, or other flammable gases with similar characteristics known to persons with ordinary skill in the art.

Referring to FIG. 1, the combustion engine system 10 includes an injector power source 63 coupled to the gaseous fuel injector 56. The injector power source 63 provides motive power for actuating the gaseous fuel injector 56 or the second gaseous fuel injector 57. Examples of the injector power source 63 include an electronic amplifier, a pressurized hydraulic source, a pressurized air source, and the like. The injector power source 63 may be controlled by the ECM 44.

Figure 3:
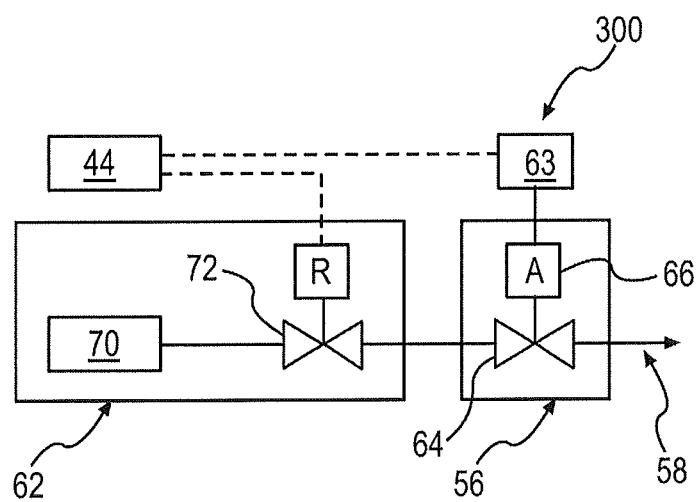
FIG. 3 presents a schematic of an injector system, according to an embodiment of the disclosure.

FIG. 3 presents a schematic of an injector system 300, according to an embodiment of the disclosure.

The injector system 300 includes a gaseous fuel injector 56 and a gaseous fuel supply system 62. The gaseous fuel injector 56 includes a valve 64 coupled to a valve actuator 66. The valve 64 could be a pintle valve, a poppet valve, or other valve with sufficiently fast time response known by persons with ordinary skill in the art.

The valve actuator 66 is driven by a power source 63 under the control of the ECM 44. In one embodiment the valve actuator 66 is a solenoid or a servomotor, and the power source 63 is an electrical power source. In another embodiment, the valve actuator is a pneumatic or hydraulic piston, and the power source 63 is a pneumatic or hydraulic power source, respectively.

Referring to FIG. 3, the gaseous fuel supply system 62 may include a pressurized gaseous fuel storage tank 70 and a regulator 72. The regulator 72 may be controlled by the ECM 44. Alternatively, the regulator 72 may be a regulator with a manual pressure set point that is not controlled by the ECM 44. The gaseous fuel pressure leaving the regulator 72 is beneficially maintained between about 7.3 psid (50 kPa) to about 73 psid (500 kPa) above a discharge pressure of the air compressor 54 (see FIG. 1).

Figure 4:
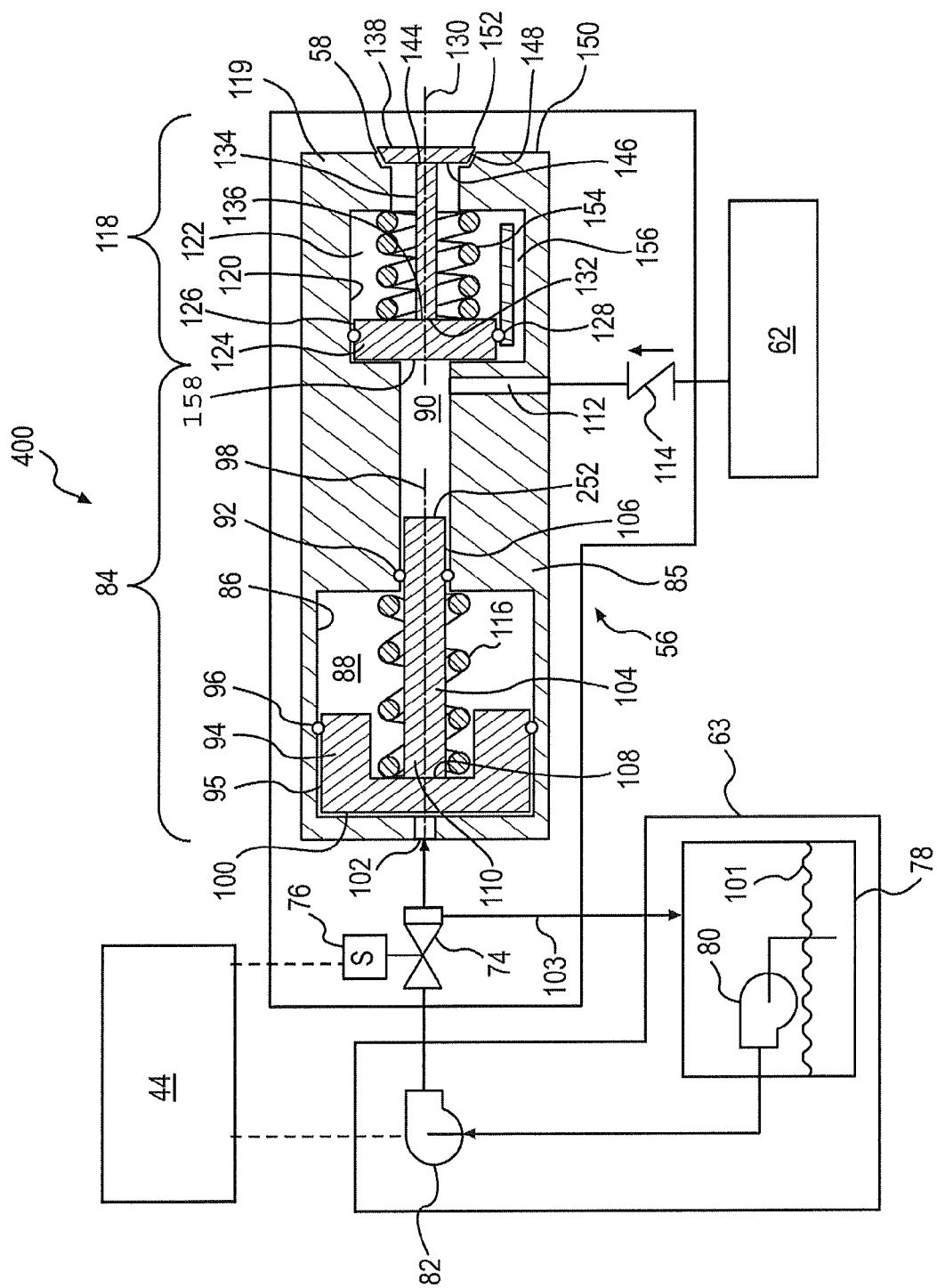
FIG. 4 presents a schematic of an injector system, according to another embodiment of the disclosure.

FIG. 4 presents a schematic of an injector system 400, according to another embodiment of the disclosure.

Injector system 400 includes a gaseous fuel injector 56 and an injector power source 63. The gaseous fuel injector 56 has a poppet valve 74 that is actuated by a solenoid 76, which is in turn controlled by the ECM 44. The Caterpillar HIA450 injector includes non-limiting examples of the poppet valve 74 and the solenoid 76.

An inlet to the poppet valve 74 is fluidly coupled to the power source 63 including an engine lube oil system 78, such that the poppet valve 74 receives pressurized lube oil from an engine lube oil pump 80 from within the engine lube oil system 78. Optionally, a hydraulic boost pump 82 may receive engine lube oil from the engine lube oil pump 80 and further pressurize the engine lube oil received by the poppet valve 74. The ECM 44 may control the operation of the hydraulic boost pump 82 to vary the pressure of the engine lube oil received by the poppet valve 74.

Referring to FIG. 4, the gaseous fuel injector 56 further includes an intensifier 84. An intensifier body 85 has an internal surface 86 defining a hydraulic chamber 88 and a gaseous fuel pump chamber 90. The hydraulic chamber 88 is separated from the gaseous fuel pump chamber 90 by at least one seal 92 disposed therebetween.

An intensifier piston 94 is slidably disposed within the hydraulic chamber 88. A peripheral surface 95 of the intensifier piston 94 engages the internal surface 86 of the intensifier 84 through at least one seal 96, such that the intensifier piston 94 translates along a longitudinal axis 98 of the intensifier 84. A proximal surface 100 of the intensifier piston 94 is in fluid communication with an outlet of the poppet valve 74 through an intensifier inlet aperture 102, thereby placing the proximal surface 100 of the intensifier piston 94 in selective communication with the engine lube oil system 78, depending upon a position of the poppet valve 74. The poppet valve 74 includes a drain 103 that effects selective fluid communication between an outlet of the poppet valve 74 and a sump 101 of the engine lube oil system 78.

A plunger 104 is disposed in the gaseous fuel pump chamber 90. A peripheral surface 106 of the plunger 104 engages the internal surface 86 of the intensifier 84 through the at least one seal 92. A distal surface 108 of the intensifier piston 94 is coupled to a proximal end 110 of the plunger 104, such that the intensifier piston 94 translates in unison with the plunger 104. The proximal surface 100 of the intensifier piston 94 is biased against the internal surface 86 of the intensifier 84 by a spring 116.

The gaseous fuel pump chamber 90 is in fluid communication with a gaseous fuel supply 62 through a fuel inlet passage 112. Further, the fuel inlet passage 112 is in fluid communication with the gaseous fuel supply 62 through a one-way check valve 114 that only permits flow of gaseous fuel in a direction from the gaseous fuel supply 62 into the gaseous fuel pump chamber 90.

Referring still to FIG. 4, the gaseous fuel injector 56 further includes a pintle valve 118. The pintle valve 118 includes a pintle body 119 with an internal surface 120 defining a pintle valve bore 122, and may include a piston 124 that is slidably disposed within the pintle valve bore 122. A peripheral surface 126 of the piston 124 may engage the internal surface 120 of the pintle valve 118 through at least one seal 128, such that the piston 124 translates along a longitudinal axis 130 of the pintle valve 118.

A proximal end 132 of a shaft 134 may be coupled to a distal surface 136 of the piston 124, and a radially flared portion 138 is coupled to a distal end 144 of the shaft 134. A proximal face 146 of the radially flared portion 138 defines a sealing surface 148, and a distal end 150 of the pintle body 119 defines a sealing surface 152. A spring 154 biases the sealing surface 148 of the radially flared portion 138 against the sealing surface 152 of the pintle body 119.

Translation of the radially flared portion 138 in a direction from the proximal end 132 of the shaft 134 toward a distal end 144 of the shaft 134 forms a gap between the sealing surface 148 and the sealing surface 152, which constitutes an outlet 58 of the gaseous fuel injector 56. Further, the pintle body 119 may define a flow channel 156 around the at least one seal 128 of the pintle valve 118, such that the proximal face 146 of the radially flared portion 138 is in fluid communication with a proximal face 158 of the piston 124 through the flow channel 156. Accordingly, a gap between the sealing surface 148 and the sealing surface 152 may be in fluid communication with the gaseous fuel pump chamber 90 via the flow channel 156 and a pintle valve inlet aperture.

Figure 5:
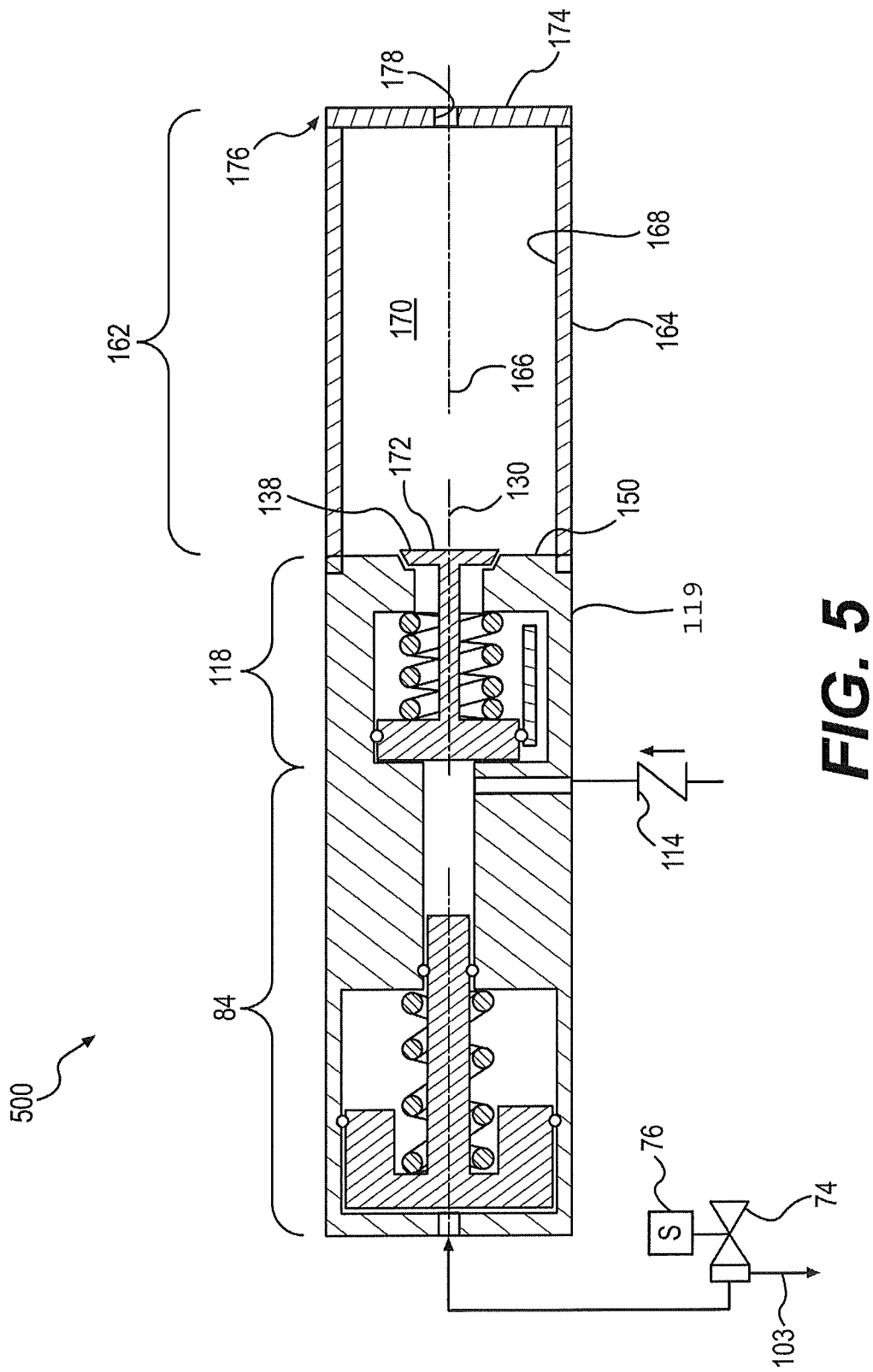
FIG. 5 presents a schematic of an injector system, according to yet another embodiment of the disclosure.

FIG. 5 presents a schematic of an injector system 500, according to yet another embodiment of the disclosure.

In FIG. 5, the injector system 500 includes an intensifier 84 fluidly coupled to a poppet valve 74, which is actuated by a solenoid 76, a pintle valve 118 fluidly coupled to the intensifier 84, and an extension tube 162 disposed on the distal end 150 of the pintle body 119 of the pintle valve 118.

Figure 6:
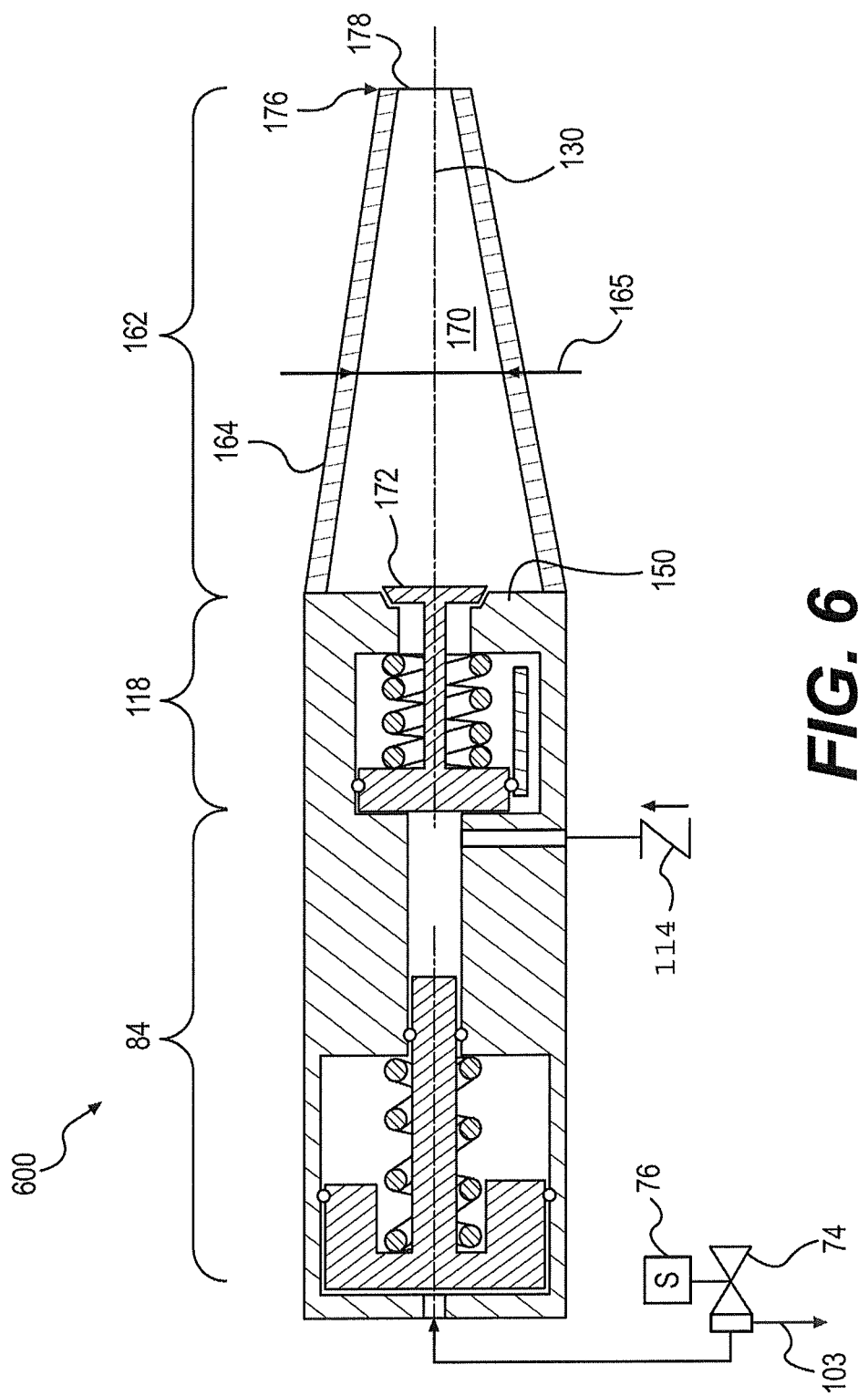
FIG. 6 presents a schematic of an injector system, according to still yet another embodiment of the disclosure.

The extension tube 162 includes a tube 164, which may have an elongated monolithic shape with a cross section such as, for example, a circular cross section, a polygonal cross section, an elliptical cross section, or the like. In an alternate embodiment of an injector system 600, as shown in FIG. 6, the tube 164 may have a frustoconical shape with an internal diameter 165 that decreases in a direction extending away from the pintle valve 118. In one embodiment, as shown in FIG. 5, the tube 164 has a straight cylindrical cross sectional shape, where a longitudinal axis 166 of the tube 164 is substantially collinear with the longitudinal axis 130 of the pintle valve 118.

An internal surface 168 of the tube 164 defines an extension tube chamber 170 therein. The extension tube chamber 170 is in fluid communication with the distal end 150 of the pintle body 119 and a distal face 172 of the radially flared portion 138. The extension tube 162 may further include an end plate 174 disposed at a distal end 176 of the tube 164. The end plate 174 may define an exit aperture 178 therethrough, such that the exit aperture 178 is in fluid communication with the extension tube chamber 170. Alternatively, the extension tube 162 may not include an end plate 174, such that the distal end 176 of the tube 164 defines an exit aperture.

Figure 7:
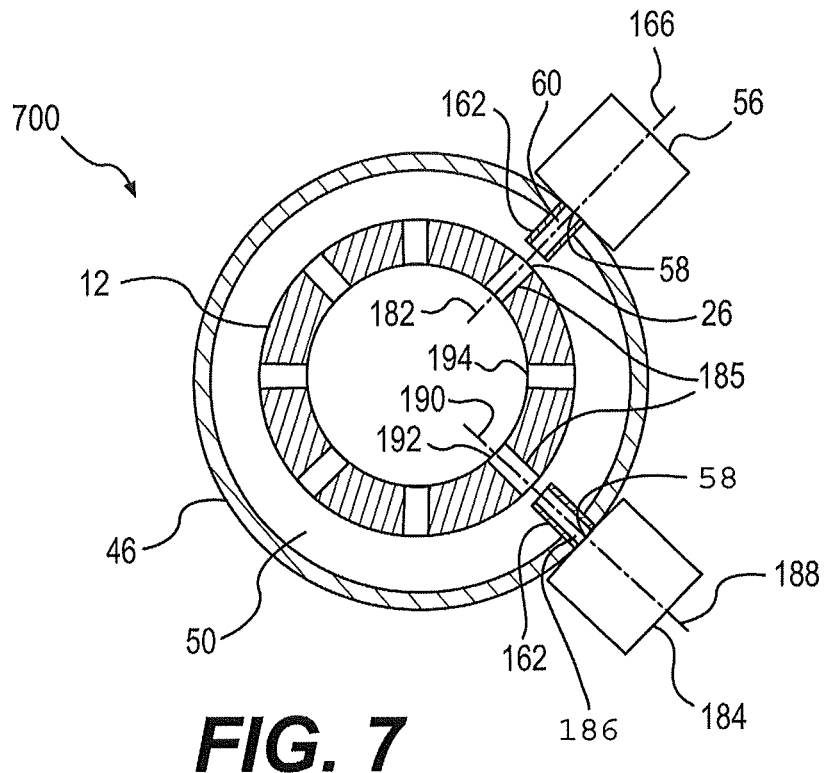
FIG. 7 presents a top cross sectional view of a combustion engine system, according to an embodiment of the disclosure.

FIG. 7 presents a top cross sectional view of a combustion engine system 700, according to an embodiment of the disclosure.

In FIG. 7, an engine cylinder 12 is surrounded by an air jacket 46, defining an air plenum 50 therebetween. The engine cylinder 12 defines at least one side port 26 therethrough. A first gaseous injector 56 is disposed on the air jacket 46, and a first extension tube 162 (best shown in FIG. 5) of the first gaseous injector 56 projects through a first aperture 60 of the air jacket 46, thereby placing an outlet 58 of the injector 56 in fluid communication with the air plenum 50 and the at least one side port 26. In one embodiment, a longitudinal axis 166 of the extension tube 162 corresponding to the first gaseous fuel injector 56 is substantially collinear with an axis 182 of the at least one side port 26.

Optionally, the combustion engine system 700 in FIG. 7 could include a second gaseous fuel injector 184 disposed on the air jacket 46. Here, the at least one side port 26 consists of a plurality of side ports 185 distributed about a circumferential direction of the engine cylinder 12. The second gaseous fuel injector 184 may have a substantially identical structure to the first gaseous fuel injector 56. However, the second gaseous fuel injector 184 may have a structure different from that of the first gaseous fuel injector 56, according to other embodiments of the present disclosure.

The second gaseous fuel injector includes an extension tube 162 (best shown in FIG. 5) that projects through a second aperture 186 of the air jacket 46, thereby placing an outlet 58 of the second gaseous fuel injector 184 in fluid communication with the air plenum 50 and the plurality of side ports 185. In one embodiment, an axis 188 of the extension tube 162 corresponding to the second gaseous fuel injector 184 is substantially collinear with an axis 190 of one of the plurality of side ports 185.

In FIG. 7, the side port 26, which is paired with the first gaseous injector 56, is separated from the side port 192, which is paired with the second gaseous injector 184, such that a side port 194 is disposed between the side port 26 and the side port 192 in the circumferential direction. However, it will be appreciated that the first gaseous fuel injector 56 could be paired with a side port that is adjacent to a side port paired with the second gaseous fuel injector 184. Moreover, it will be appreciated that any number of side ports could separate a side port paired with the first gaseous fuel injector 56 and a side port paired with the second gaseous fuel injector 184 in a circumferential direction about the engine cylinder 12.

Although only two gaseous fuel injectors 56, 184 are shown in FIG. 7, it will be appreciated that the combustion engine system 700 could include any number of gaseous fuel injectors. In one embodiment, the number of gaseous fuel injectors is equal to the number of the plurality of side ports 185, such that each of the plurality of gaseous fuel injectors is uniquely paired and aligned with one of the plurality of side ports. In another embodiment, the number of gaseous fuel injectors is equal to one fourth the number of the plurality of side ports 185, such that each of the plurality of gaseous fuel injectors is paired and aligned with alternating side ports around the circumference of the engine cylinder 12.

Figure 8:
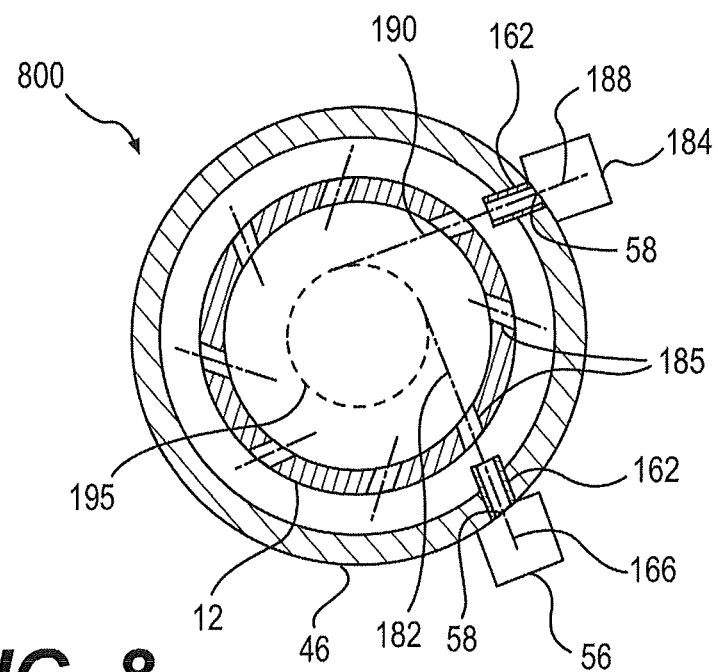
FIG. 8 presents a top cross sectional view of a combustion engine system, according to another embodiment of the disclosure.

Optionally, as shown in FIG. 8, the axis 166 of the extension tube 162 corresponding to the first gaseous fuel injector 56 may be tangent to a circle 195 disposed within the engine cylinder 12 of combustion engine system 800. Further, the axis 188 of the extension tube 162 corresponding to the second gaseous fuel injector 184 may be tangent to the circle 195 disposed within the engine cylinder 12. In turn, the tangential injection of gaseous fuel and air into the cylinder bore 16 may beneficially promote mixing thereof. The axes 182 and 190 of the side ports 185 may or may not be collinear with the axes 166 and 188. Indeed, in some configurations of the combustion engine system 800, mixing within the cylinder bore 16 may be enhanced by the axes 182 and 190 not being coaxial with the axes 166 and 188, respectively, thereby creating additional shear between air flowing through the side ports 185 and gaseous fuel injected through the gaseous fuel injectors 56 and 184.

Figure 9:
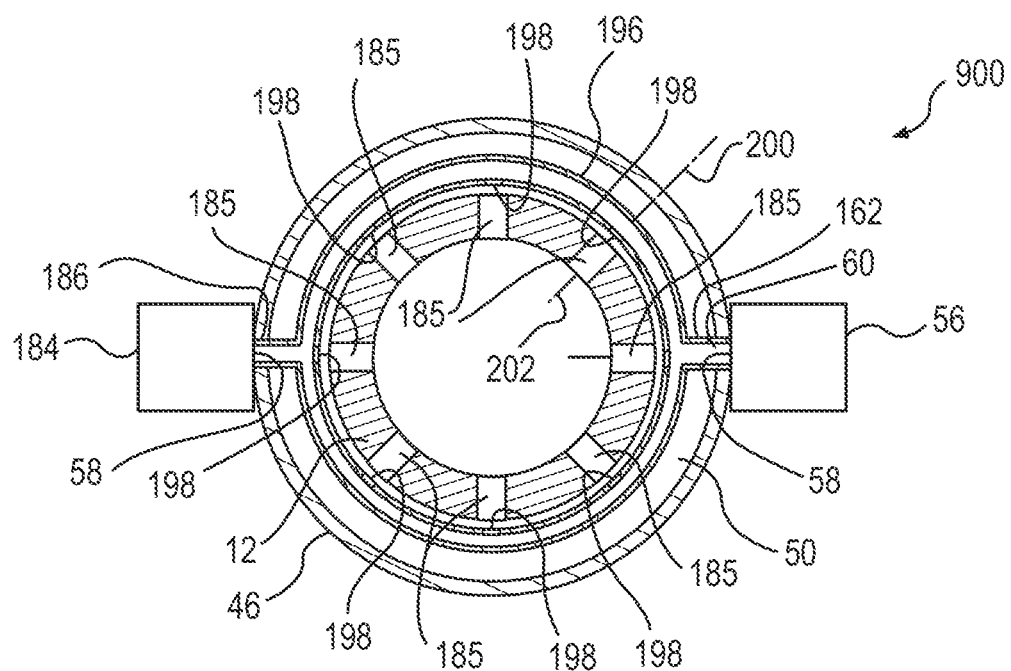
FIG. 9 presents a top cross sectional view of a combustion engine system, according to yet another embodiment of the disclosure.

FIG. 9 presents a top cross sectional view of a combustion engine system 900, according to another embodiment of the disclosure.

In FIG. 9, an engine cylinder 12 is surrounded by an air jacket 46, defining an air plenum 50 therebetween. The engine cylinder 12 defines a plurality of side ports 185 therethrough. A first gaseous injector 56 is disposed on the air jacket 46, and a extension tube 162 of the first gaseous injector 56 projects through a first aperture 60 of the air jacket 46. The first extension tube 162 is fluidly coupled to an annular ring extension tube 196 disposed within the air plenum 50.

Figure 10:
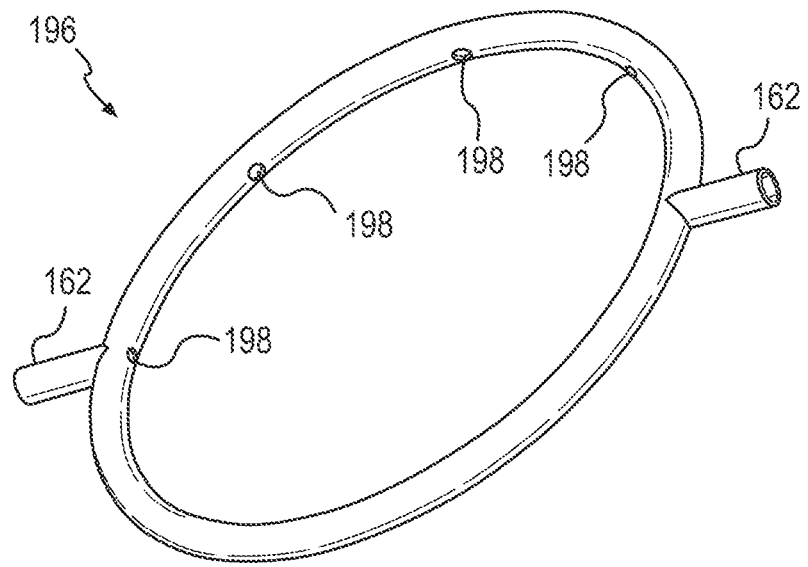
FIG. 10 presents a perspective view of an extension tube, according to an embodiment of the disclosure.

Referring to FIG. 10, the annular ring extension tube 196 has a hollow toroidal structure and includes a plurality of apertures 198 through a wall of the annular ring extension tube 196. As shown in FIG. 9, the plurality of apertures 198 are in fluid communication with the air plenum 50, thereby placing an outlet 58 of the first gaseous injector 56 in fluid communication with the plurality of side ports 185 through the plurality of apertures 198. In one embodiment, an axis 200 of one of the plurality of apertures 198 is substantially collinear with an axis 202 of one of the plurality of side ports 185. In another embodiment, an axis of each of the plurality of side ports 185 is collinear with an axis of one of the plurality of apertures 198.

The cross sectional flow area of each of the plurality of apertures 198 may be identical. Alternatively, the cross sectional flow area of each of the plurality of apertures 198 may be tailored to provide a beneficial circumferential distribution of fuel flow through each of the plurality of apertures 198 around the annular ring extension tube 196.

Optionally, the combustion engine system 900 in FIG. 9 could include a second gaseous fuel injector 184 is disposed on the air jacket 46. The second gaseous fuel injector 184 may have a substantially identical structure to the first gaseous fuel injector 56. However, the second gaseous fuel injector 184 may have a structure different from that of the first gaseous fuel injector 56, according to other embodiments of the present disclosure.

The second gaseous fuel injector includes an extension tube 162 that projects through a second aperture 186 of the air jacket 46, thereby placing an outlet 58 of the second gaseous fuel injector 184 in fluid communication with the annular ring extension tube 196. Although only two injectors 56, 184 are shown in FIG. 9, it will be appreciated that the combustion engine system 900 could include any number of gaseous fuel injectors that are fluidly coupled to the annular ring extension tube 196.

Figure 11:
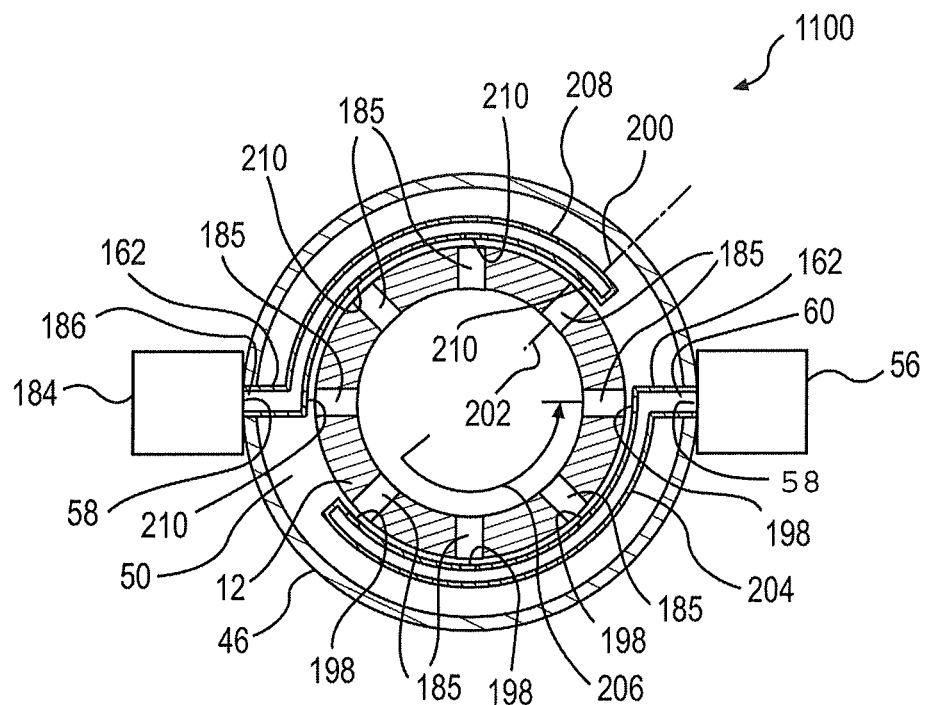
FIG. 11 presents a top cross sectional view of a combustion engine system, according to still yet another embodiment of the disclosure.

FIG. 11 presents a top cross sectional view of a combustion engine system 1100, according to yet another embodiment to the disclosure.

In FIG. 11, an engine cylinder 12 is surrounded by an air jacket 46, defining an air plenum 50 therebetween. The engine cylinder 12 defines a plurality of side ports 185 therethrough. A first gaseous injector 56 is disposed on the air jacket 46, and a extension tube 162 of the first gaseous injector 56 projects through a first aperture 60 of the air jacket 46. The extension tube 162 is fluidly coupled to an annular sector extension tube 204 disposed within the air plenum 50.

Figure 12:
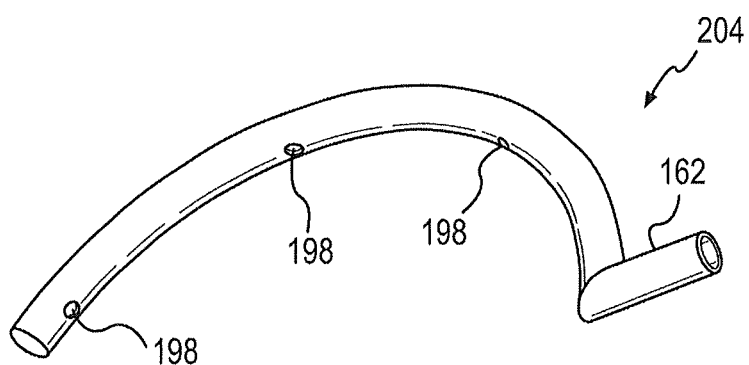
FIG. 12 presents a perspective view of an extension tube, according to another embodiment of the disclosure.

Referring to FIG. 12, the annular sector extension tube 204 has a hollow toroidal structure and includes a plurality of apertures 198 through a wall of the annular sector extension tube 204. As shown in FIG. 11, the plurality of apertures 198 are in fluid communication with the air plenum 50, thereby placing an outlet 58 of the first gaseous injector 56 in fluid communication with the plurality of side ports 185 through the plurality of apertures 198. In one embodiment, an axis 200 of one of the second plurality of apertures 210 is substantially collinear with an axis 202 of one of the plurality of side ports 185. The annular sector extension tube 204 extends over a sector angle 206 less than 360 degrees in an azimuthal direction around the engine cylinder 12.

The cross sectional flow area of each of the plurality of apertures 198 through the annular sector extension tube 204 may be identical. Alternatively, the cross sectional flow area of each of the plurality of apertures 198 may be tailored to provide a beneficial circumferential distribution of fuel flow through each of the plurality of apertures 198 around the annular ring sector extension tube 204.

Optionally, the combustion engine system 1100 in FIG. 11 could include a second gaseous fuel injector 184 disposed on the air jacket 46. The second gaseous fuel injector 184 may have a substantially identical structure to the first gaseous fuel injector 56. However, the second gaseous fuel injector 184 may have a structure different from that of the first gaseous fuel injector 56, according to other embodiments of the present disclosure.

The second gaseous fuel injector includes an extension tube 162 that projects through a second aperture 186 of the air jacket 46, thereby placing an outlet 58 of the second gaseous fuel injector 184 in fluid communication with a second annular sector extension tube 208, including a second plurality of apertures 210 through a wall of the second annular sector extension tube 208. Although only two injectors 56, 184 are shown in FIG. 11, it will be appreciated that the combustion engine system 1100 could include any number of gaseous fuel injectors 56 that are fluidly coupled either individually or in combination with any number of annular sector extension tubes 204.

INDUSTRIAL APPLICABILITY

The present disclosure is universally applicable to both two-stroke and four-stroke compression ignition engines such as, for example, Diesel engines and homogenous charge compression ignition (HCCI) engines, that are at least partly fueled by a gaseous fuel. Further, the present disclosure is applicable to any machine incorporating a compression ignition engine, such as, for example, locomotives, on-road vehicles, off-road vehicles, maritime vehicles, stationary power generation units, and other machines known to persons with ordinary skill in the art.

Operators benefit from flexibility in choosing a fuel composition for their compression ignition engines for a variety of reasons. First, fuel flexibility allows operators to better minimize fuel costs in response to short-term market price fluctuations by purchasing the most economical fuel composition at any given point in time. Second, fuel flexibility allows operators to better respond to geographical variations in the availability of different fuel compositions, especially among operators of long-haul locomotives, trucks, and ships, whose routes span long distances. Third, fuel flexibility allows operators to better respond to changes in emissions regulations, both in time and across geographical boundaries. Indeed, fuel choice effects the range of engine emissions possible for a given hardware configuration, and an operator may beneficially avoid the need to reconfigure engine hardware in response to changes in emissions regulations given flexibility in fuel choice.

Gaseous fuels including natural gas, methane, hydrogen, and propane, for example, have been identified as beneficial alternatives to diesel fuel, both because of fuel economy and the ability to adapt existing engine designs to meet regional emissions requirements by substituting gaseous fuel at least partly for liquid fuel. Although compression ignition engines may be operated on a single gaseous fuel composition, Applicants have discovered benefits to operating a compression ignition engine using a combination of gaseous fuel and liquid fuel.

Indeed, most gaseous fuel alternatives to diesel fuel have low effective cetane ratings, therefore making it difficult to control autoignition of fuel-air mixtures in response to compression within an engine cylinder. In turn, small variations in overall cylinder equivalence ratio or local equivalence ratio within an engine cylinder can produce disadvantageous variations in ignition timing, resulting in engine knock or high unburned fuel concentrations in the engine exhaust, for example.

Embodiments of the present disclosure solve the problem of gaseous fuel ignition control by direct injection of liquid fuel at a time following injection of the gaseous fuel into the engine cylinder 12. In one embodiment, gaseous fuel is injected into the cylinder 12 of a two-stroke compression ignition engine via side ports 26 through the engine cylinder 12 wall, and liquid fuel is injected via the fuel injector 36, which extends through the cylinder head 20.

Figure 13:
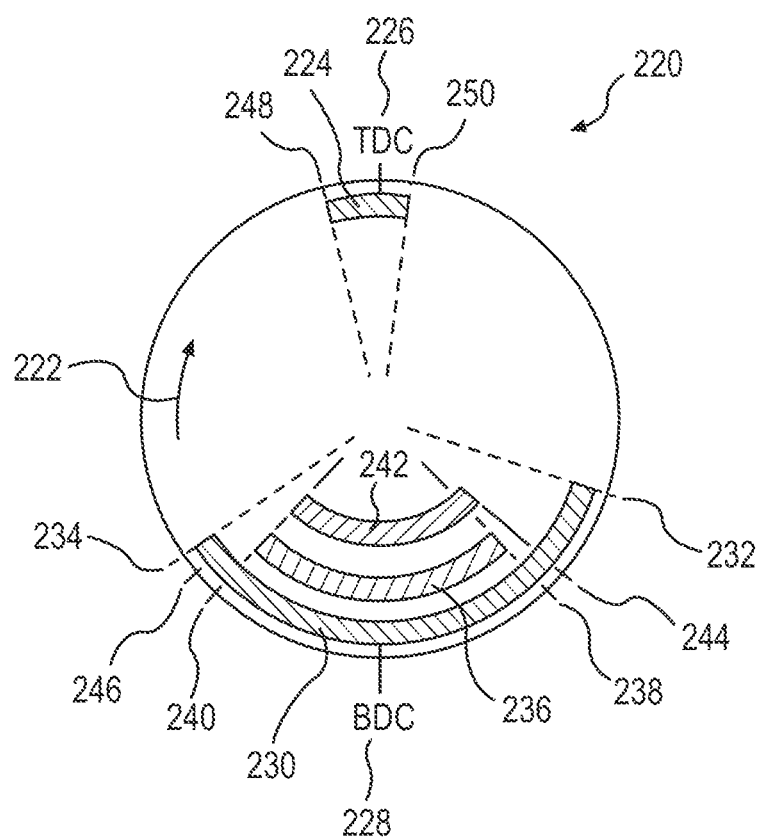
FIG. 13 presents a timing diagram for a combustion engine system, according to an embodiment of the disclosure.

FIG. 13 presents a timing diagram 220 for a combustion engine system 10, according to an embodiment of the disclosure.

In FIG. 13, clockwise motion around the timing diagram 220 depicts a forward time coordinate 222 for crankshaft revolution in a two-stroke compression ignition engine. The forward time coordinate 222 may be measured in units of time or degrees of crank angle revolution. During a period of liquid fuel injection 224 near top dead center 226 (TDC) of the cycle, the exhaust valves 34 and the side ports 26 are closed, as shown in FIG. 2. As the fuel-air mixture autoignites in response to the pressure and temperature of compression within the cylinder bore, the fuel-air mixture burns and expands, thereby driving the piston 18 downward as the crank angle progresses toward bottom dead center 228 (BDC) of the cycle.

The exhaust valves 34 are open for a duration 230, extending from a time of exhaust valves opening 232 to a time of exhaust valves closing 234. Throughout the time duration 230, the cylinder bore is in fluid communication with the exhaust manifold (not shown) through the exhaust valves 34, and a pressure difference between the cylinder bore 16 and the exhaust manifold drives the products of combustion out of the cylinder bore 16 and into the exhaust manifold. In one embodiment, the time of exhaust valves opening 232 corresponds to about 257 degrees before TDC 226, and the time of exhaust valves closing 234 corresponds to about 119 degrees before TDC 226.

The side ports 26 are open for a duration 236, extending from a time of the side ports opening 238 to a time of the side ports closing 240. Throughout the time duration 236, a portion of the cylinder bore disposed between the upper set of rings 28 and the cylinder head 20 is in fluid communication with the air supply 52, as shown in FIG. 1. When the air supply includes an air compressor 54, such as a compressor in a turbocharger or a supercharger, a pressure difference between an outlet of the compressor 54 and the cylinder bore 16 drives fresh air into the cylinder bore 16, and may contribute to further driving combustion products from the previous cycle out of the cylinder bore 16 and into the exhaust manifold. In one embodiment, the time of the side ports opening 238 corresponds to about 225 degrees before TDC 226, and the time of the side ports closing 240 corresponds to about 135 degrees before TDC 226.

In one embodiment of the present disclosure, a time duration 242 for injecting gaseous fuel into the cylinder bore 16 overlaps with the time duration 236, depicting when the side ports 26 are open, because the gaseous fuel injector 56 is in fluid communication with the cylinder bore 16 via the side ports 26. Optionally, a time for the start of gaseous fuel injection 244 may begin before or after the time of the side ports opening 238. Further, a time for the end of gaseous fuel injection 246 may occur up to the time of the side ports closing 240.

In one embodiment, a time for the start of gaseous fuel injection 244 may begin as early as 146 degrees after TDC 226, and a time for the end of gaseous fuel injection may occur as late as 216 degrees after TDC 226. Coordination of the duration 242 for injecting gaseous fuel with the duration 236 of the side ports open and the duration 230 of the exhaust valves open is selected to promote accurate delivery of the desired amount of gaseous fuel, promote mixing between the gaseous fuel and air, and minimize carry-over of gaseous fuel from the gaseous fuel injector 56 through the open exhaust valves 34 before the start of combustion.

The liquid fuel injector 36 is open for the duration 224, extending from a time of opening the liquid fuel injector 248 to a time of closing the liquid fuel injector 250. While the fuel injector 36 is open, liquid fuel from the liquid fuel supply 40 is injected into the cylinder bore 16 through the at least one liquid fuel injector orifice 38 (FIG. 1). The time for opening the liquid fuel injector 248 can occur as early as 20 degrees before TDC 226, or as late as some time after TDC 226. The time for closing the liquid fuel injector 250 can occur as early as some time before TDC 226, to as late as 20 degrees after TDC 226.

The time of starting liquid fuel injection 248 and the duration 224 for injecting liquid fuel is selected to promote accuracy of the total amount of liquid fuel delivered to the cylinder bore 16, promote engine thermal efficiency, promote complete combustion of the gaseous fuel and the liquid fuel within the cylinder bore 16, and to minimize overall regulated combustion emissions, for example. The optimum start of liquid fuel injection 248 and duration 224 for liquid fuel injection may vary depending upon engine speed, engine load, the balance of gaseous fuel injected to liquid fuel injected, as well as environmental variables such as ambient temperature or humidity, for example. In one embodiment, the ECM 44 is configured to optimize the combined gaseous and liquid fuel injection processes in real time based on open-loop operating maps; closed-loop transfer functions based on a sensed state of the combustion engine system 10, stored fuel composition measurements, or environmental measurements; or combinations thereof, for example.

Injecting the gaseous fuel near bottom dead center 228 (BDC) of the stroke requires much lower gaseous fuel pressure supplied to the gaseous fuel injector 56 than that required to achieve HPDI near top dead center of the stroke, as described in the '043 patent or other conventional approaches. Further, injection of the gaseous fuel near BDC 228 provides much longer durations for mixing the fuel and air than that described in the '043 patent. Moreover, fuel injected into the cylinder bore 16 near BDC 228 of the stroke experiences larger amplitudes of piston motion than those described in the '042 patent, which further contributes to mixing between the gaseous fuel and air in the cylinder bore 16 according to embodiments of the present disclosure.

Figure 14:
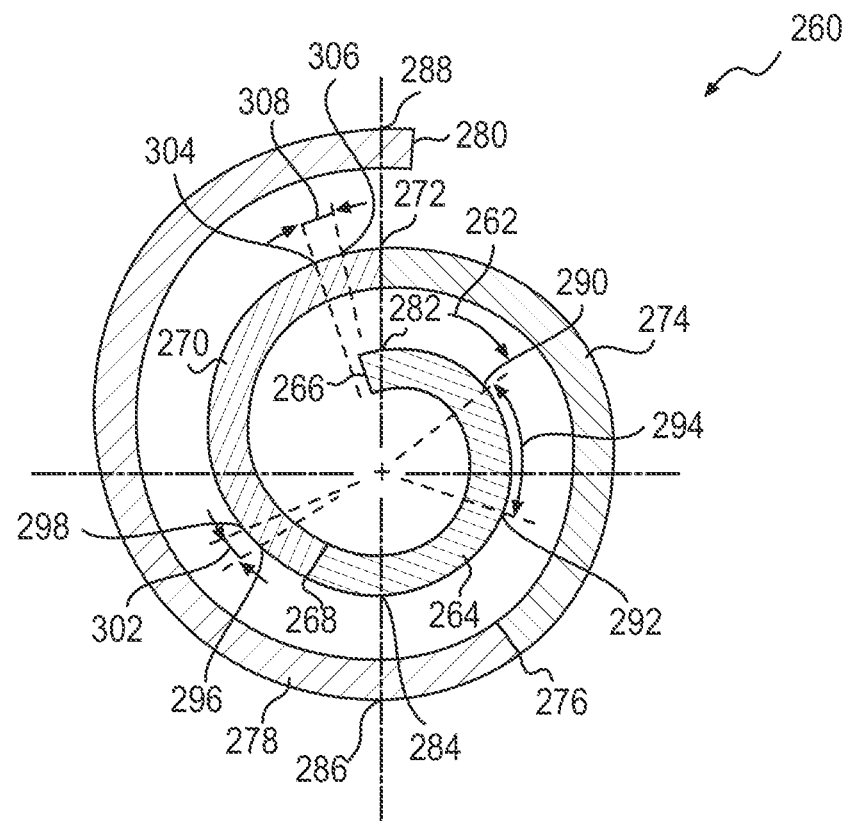
FIG. 14 presents a timing diagram for a combustion engine system, according to another embodiment of the disclosure.

FIG. 14 presents a timing diagram 260 for a combustion engine system 10, according to another embodiment of the disclosure.

In FIG. 14, clockwise motion around the timing diagram 260 depicts a forward time coordinate 262 for crankshaft revolution in a four-stroke compression ignition engine. The forward time coordinate 262 may be measured in units of time or degrees of crank angle revolution. An intake stroke 264 begins at a time of intake valves opening (IVO) 266 and ends at a time of intake valves closing (IVC) 268. A compression stroke 270 may begin at the time of IVC 268 and may end when the piston reaches TDC of the compression stroke 272. A power stroke 274 may begin at TDC of the compression stroke 272 and ends at a time of exhaust valves opening (EVO) 276. An exhaust stroke 278 begins at the time of EVO 276 and extends to a time of exhaust valves closing (EVC) 280.

In one embodiment of the present disclosure, the time of IVO 266 is about 5 degrees before TDC of the intake stroke 282, and a time of IVC 268 is about 35 degrees after BDC of the intake stroke 284. In another embodiment of the present disclosure, the time of EVO 276 is about 35 degrees before BDC of the exhaust stroke 286, and the time of EVC 280 is about 5 degrees after TDC of the exhaust stroke 288. However, it will be appreciated that other timings may be selected for IVO 266, IVC 268, EVO 276, and EVC 280.

Gaseous fuel is injected into the combustion engine system 10 from a time of beginning gaseous fuel injection 290 to a time of ending gaseous fuel injection 292. In one embodiment of the present disclosure, the time of beginning gaseous fuel injection 290 begins no earlier than about 360 degrees before TDC of the compression stroke 272, and a time of ending gaseous fuel injection 292 ends no later than about 90 degrees before TDC of the compression stroke 272. In another embodiment of the present disclosure, a duration of gaseous fuel injection 294 extends between about 10 degrees and about 90 degrees of crank angle revolution. However, it will be appreciated that other times may be employed for the time of beginning gaseous fuel injection 290, the time of ending gaseous fuel injection 292, and the duration of gaseous fuel injection 294.

Optionally, liquid fuel is injected into the combustion engine system 10 from a time of beginning pilot fuel injection 296 to a time of ending pilot fuel injection 298. In one embodiment of the present disclosure, the time of beginning pilot fuel injection 296 begins no earlier than about 360 degrees before TDC of the compression stroke 272, and a time of ending pilot fuel injection 298 ends no later than about 50 degrees before TDC of the compression stroke 272. In another embodiment of the present disclosure, a duration of pilot fuel injection 302 extends for about 5 degrees of crank angle revolution. However, it will be appreciated that other times may be employed for the time of beginning pilot fuel injection 296, the time of ending pilot fuel injection 298, and the duration of pilot fuel injection 302.

Liquid fuel is injected into the combustion engine system 10 from a time of beginning ignition fuel injection 304 to a time of ending ignition fuel injection 306. In one embodiment of the present disclosure, the time of beginning ignition fuel injection 304 begins no earlier than about 30 degrees before TDC of the compression stroke 272, and the time of ending ignition fuel injection 306 ends no later than about 5 degrees before TDC of the compression stroke 272. In another embodiment of the present disclosure, a duration of ignition fuel injection 308 extends for about 5 degrees of crank angle revolution. However, it will be appreciated that other times may be employed for the time of beginning ignition fuel injection 304, the time of ending ignition fuel injection 306, and the duration of ignition fuel injection 308. The liquid fuel injected during the duration of ignition fuel injection 308 autoignites in response to the temperature and pressure within the cylinder bore 16 of the combustion engine system 10, for the purpose of igniting all fuel, gaseous or liquid, within the cylinder bore.

According to another embodiment of the present disclosure, the gaseous fuel injector 56 includes an intensifier 84 and a pintle valve 118, as shown in FIG. 4. In this embodiment gaseous fuel is admitted from a gaseous fuel supply 62 into the fuel pump chamber 90 of the intensifier 84 through a check valve 114 and the fuel inlet passage 112. Then, the gaseous fuel is compressed by translation of the plunger 104 within the fuel pump chamber 90 as next discussed.

In one embodiment, the injector power source 63 is a hydraulic power source using engine lube oil from an engine lube oil system 78, as shown in FIG. 4, for example. An engine lube oil pump 80 delivers engine lube oil from an engine lube oil sump 101 to an inlet of the poppet valve 74. Optionally, a hydraulic boost pump 82, which may be under the control of the ECM 44, receives the engine lube oil from the engine lube oil pump 80 and further increases the pressure of the engine lube oil before delivering the engine lube oil to the inlet of the poppet valve 74.

A solenoid 76 opens and closes the poppet valve 74 under the control of the ECM 44. When the poppet valve 74 is actuated by the solenoid 76 into an open position, an inlet aperture 102 of the intensifier 84 is in fluid communication with the injector power source 63, and the drain 103 between the exit of the poppet valve 74 and the engine lube oil sump 101 is closed. Accordingly, engine lube oil flowing through the poppet valve 74 applies hydraulic pressure to a proximal surface 100 of the intensifier piston 94, which is in turn applied to the plunger 104 to compress the gaseous fuel within the fuel pump cavity 90. The check valve 114 prevents flow of gaseous fuel from fuel pump chamber 90 back into the gaseous fuel supply 62.

Compressing the gaseous fuel within the intensifier 84 provides benefits over conventional approaches by enabling engine operation with gaseous fuels stored at lower pressures. Indeed, the pressure gained by the gaseous fuel through the intensifier 84 enables shorter injection times for a given quantity of gaseous fuel, compared to similar configurations with the same gaseous fuel storage pressure and no intensifier 84. Further, the positive displacement nature of the intensifier 84 operation provides benefits over conventional cryogenic or other turbomachinery-based compression strategies in terms of cost and complexity, stemming at least in part from utilization of the existing engine lube oil system 78 as the motive power source for compressing the gaseous fuel within the intensifier 84.

A ratio between an area of the proximal surface 100 of the intensifier piston 94 and an area of the distal end 252 of the plunger 104 determines a pressure ratio of the intensifier 84 by force balance. In one embodiment, the intensifier pressure ratio is not less than about three. In another embodiment, the intensifier pressure ratio is not greater than about seven. In yet another embodiment, the intensifier 84 has a pressure ratio of about seven, and the engine lube oil exerts a pressure of about 58 psi (400 kPa) onto the proximal surface 100 of the intensifier piston 94, which results in a maximum achievable gaseous fuel pressure within the fuel pump cavity 90 of about 406 psi (2800 kPa). In still yet another embodiment, the gaseous fuel pressure generated by the intensifier is maintained between about 7.3 psid (50 kPa) to about 73 psid (500 kPa) above a discharge pressure of the air compressor 54 (see FIG. 1).

It will be appreciated that achieving the maximum gaseous fuel pressure within the fuel pump cavity 90 depends upon the gaseous fuel supply pressure and the stroke of the plunger 104, given the compressible nature of gaseous fuel. Further, it will be appreciated that larger intensifier 84 pressure ratios may be beneficial for two-stroke engines compared to four-stroke engines because the time window for injecting the gaseous fuel is shorter for two-stroke applications than four-stroke applications.

A threshold pressure difference between the fuel pump chamber 90 of the intensifier 84 and a pressure on a distal surface of the radially flared portion 138 acts to translate the pintle shaft 134 away from the fuel pump chamber 90, against the force of the spring 154, thereby creating a gap between the sealing surface 152 on the radially flared portion 138 and the sealing surface 148 on the pintle body 119. The gap between the sealing surface 148 and the sealing surface 152 constitutes an outlet 58 of the gaseous fuel injector 56 that allows the gaseous fuel to flow from the fuel pump chamber 90, through the flow channel 156, and out of the gaseous fuel injector 56 through outlet 58. In one embodiment, the pressure within the fuel pump chamber 90 acts on the piston 124 to open the pintle valve 118.

In another embodiment, the injector system 400 does not include a piston 124 disposed on the proximal end 132 of the shaft 134. In such an embodiment, pressure in the gaseous fuel pump chamber 90 acts against the proximal face 146 of the radially flared portion 138 and the proximal end 132 of the shaft 134 to translate the pintle shaft 134 away from the fuel pump chamber 90, against the force of the spring 154, thereby creating a gap between the sealing surface 152 on the radially flared portion 138 and the sealing surface 148 on the pintle body 119. Further, in the absence of the piston 124 the spring 154 may be coupled directly to the shaft 134 by a fastener or other spring retainer known to persons with ordinary skill in the art.

In one embodiment, the flow area of the injector outlet 58 is designed to minimize the pressure drop across the injector outlet 58. In another embodiment of the present disclosure, the flow area of the injector outlet 58 is designed to effect sonic or choked flow across the injector outlet 58.

Metering of the total quantity of gaseous fuel delivered to the cylinder bore 16 during one cycle of the crankshaft is determined by plunger 104 displacement within the intensifier 84. Further, the delivery rate of gaseous fuel through the outlet 58 of the injector 56 is determined by factors such as intensifier 84 pressure ratio, hydraulic fluid supply pressure from the injector power source 63, pressure from the gaseous fuel supply 62, the stiffness of spring 116 within the intensifier 84, and the stiffness of spring 154 within the pintle valve 118, for example.

To stop the injection of gaseous fuel from the outlet 58 of the injector 56, the ECM 44 causes the solenoid 76 to close poppet valve 74 and open the drain 103 between the poppet valve exit and the engine lube oil sump 101. As hydraulic pressure on the proximal surface 100 of the intensifier piston 94 decreases, the spring 116 urges the plunger 104 back toward a rest position. In turn, gaseous fuel pressure within the fuel pump chamber 90 decreases eventually to where the sealing surface 152 on the pintle rests against the sealing surface 148 on the pintle body 119 under the force of spring 154, thereby stopping the flow of gaseous fuel from the gaseous fuel injector 56.

Accordingly, embodiments of the present disclosure that include gaseous fuel injectors 56 with intensifiers 84 and pintle valves 118 enable rapid injection of large volumes of gaseous fuel into combustion engines without the need for high gaseous fuel storage pressures. Further, embodiments of the present disclosure provide beneficial flexibility to tailor the timing, quantity, and rate shape of gaseous fuel injections through control of the gaseous fuel injectors 56 by the ECM 44.

The many features and advantages of this disclosure are apparent from the detailed specification, and thus, it is intended by the appended claims to cover all such features and advantages which fall within its true spirit and scope. Further, because numerous modifications and variations will readily occur to those skilled in the art, it is not desired to limit the disclosure to the exact construction and operation illustrated and described, and accordingly, all suitable modifications and equivalents may be resorted to that fall within the scope of this disclosure.

What is claimed is:

1. A gaseous fuel injector, comprising:
   a pintle valve including:
      a pintle body defining a pintle bore therethrough,
      a first sealing surface disposed on a distal end of the pintle body, and
      a pintle disposed within the pintle bore, the pintle including:
         a shaft,
         a radially flared portion disposed at a distal end of the pintle,
         a second sealing surface disposed on a proximal face of the radially flared portion, such that the first sealing surface faces the second sealing surface, and
         a pintle piston disposed at a proximal end of the pintle, the pintle piston having a proximal face in fluid communication with a gaseous fuel supply via a check valve, the proximal end of the pintle being opposite the distal end of the pintle;
   an intensifier including:
      an intensifier body defining a fuel pump chamber therein, the fuel pump chamber being fluidly coupled to a gaseous fuel supply and the pintle bore,
      a plunger having a distal end disposed in the fuel pump chamber, and
      an intensifier piston disposed on a proximal end of the plunger; and
   an extension tube disposed on the distal end of the pintle body, an internal surface of the extension tube defining an extension tube cavity therein, the extension tube cavity being in selective fluid communication with the pintle bore depending upon a position of the pintle relative to the pintle body.

2. The gaseous fuel injector of claim 1, further comprising:
   a poppet valve fluidly coupled to a hydraulic fluid supply and the intensifier piston; and
   a solenoid coupled to the poppet valve.

3. The gaseous fuel injector of claim 1, wherein an end of the extension tube opposite the distal end of the pintle body defines an aperture therethrough.

4. The gaseous fuel injector of claim 3, wherein an area of the aperture is smaller than a cross sectional area of the extension tube cavity transverse to a bulk flow direction through the extension tube cavity.

5. The gaseous fuel injector of claim 3, wherein the extension tube includes a frustoconical tube, and an inner diameter of the frustoconical tube decreases in a flow direction away from the pintle valve.

6. The gaseous fuel injector of claim 1, further comprising:
   a first spring member disposed between the intensifier piston and the intensifier body, such that the first spring member biases the intensifier piston away from the fuel pump chamber.

7. The gaseous fuel injector of claim 6, further comprising:
   a second spring member disposed between the pintle and the pintle body, such that the second spring member biases the first sealing surface against the second sealing surface.

8. A combustion engine system, comprising:
   an engine cylinder defining a cylinder bore therethrough; and
   a gaseous fuel injector fluidly coupled to a gaseous fuel supply and the cylinder bore, the gaseous fuel injector including:
      a pintle valve including a pintle body defining a pintle bore therethrough, a first sealing surface disposed on a distal end of the pintle body, and a pintle disposed within the pintle bore, the pintle including:
         a shaft,
         a radially flared portion disposed at a distal end of the pintle,
         a second sealing surface disposed on a proximal face of the radially flared portion, such that the first sealing surface faces the second sealing surface, and
         a pintle piston disposed at a proximal end of the pintle, the pintle piston having a proximal face in fluid communication with a gaseous fuel supply via a check valve, the proximal end of the pintle being opposite the distal end of the pintle;
      an intensifier including:
         an intensifier body defining a fuel pump chamber therein, the fuel pump chamber being fluidly coupled to a gaseous fuel supply and the pintle valve,
         a plunger having a distal end disposed in the fuel pump chamber, and
         an intensifier piston disposed on a proximal end of the plunger, the intensifier piston being fluidly coupled to a hydraulic fluid supply; and
      an extension tube disposed on a distal end of the pintle body, an internal surface of the extension tube defining an extension tube cavity therein, the extension tube cavity being in selective fluid communication with the pintle bore depending upon a position of the pintle relative to the pintle body.

9. The combustion engine system of claim 8, further comprising:
a poppet valve fluidly coupled to the hydraulic fluid supply and the intensifier piston; and a solenoid coupled to the poppet valve.

10. The combustion engine system of claim 8, further comprising an extension tube fluidly coupled to an outlet of the gaseous fuel injector.

11. The combustion engine system of claim 10, wherein the extension tube includes an elongated cylindrical tube.

12. The combustion engine system of claim 10, wherein the extension tube includes a frustoconical tube, and an inner diameter of the frustoconical tube decreases in a flow direction away from the pintle valve.

13. The combustion engine system of claim 10, wherein the extension tube defines at least one aperture therethrough.

14. The combustion engine system of claim 13, wherein an axis of the at least one aperture is collinear with an axis of a side port defined by the engine cylinder.

15. The combustion engine system of claim 13, wherein an axis of the at least one aperture is tangent to a circle disposed within the engine cylinder.

16. The combustion engine system of claim 8, wherein the engine cylinder defines at least one side port through a wall of the engine cylinder, such that the at least one side port is in fluid communication with the cylinder bore,
the combustion engine system further comprises an inlet air jacket disposed around an outer surface of the engine cylinder that includes the at least one side port, the inlet air jacket and the outer surface of the engine cylinder defining an air plenum therebetween, the air plenum being in fluid communication with an air source and the at least one side port, and
wherein an outlet of the pintle valve is in fluid communication with the cylinder bore through the at least one side port.

17. The combustion engine system of claim 16,
wherein the extension tube includes an arcuate tube disposed within the air plenum.

18. The combustion engine system of claim 8, further comprising a liquid fuel injector in fluid communication with the cylinder bore and a liquid fuel supply.

19. A method of injecting a gaseous fuel into a reciprocating combustion engine including a gaseous fuel injector having a plunger disposed in a fuel pump chamber, an intensifier piston coupled to the plunger, the intensifier piston being fluidly coupled to a hydraulic fluid supply, the fuel pump chamber being fluidly coupled to a gaseous fuel supply, and a pintle valve fluidly coupled to the fuel pump chamber, the method comprising:
admitting a gaseous fuel from the gaseous fuel supply into the fuel pump chamber via a check valve;
applying a hydraulic pressure from the hydraulic fluid supply to the intensifier piston;
translating the plunger within the fuel pump chamber, thereby compressing the gaseous fuel against a proximal face of a pintle piston disposed at an end of the pintle valve;
translating a pintle of the pintle valve away from the gaseous fuel injector in response to the compressing the gaseous fuel against the proximal face of the pintle piston disposed at the end of the pintle valve;
flowing the gaseous fuel from an outlet of the pintle valve through an extension tube disposed between the outlet of the pintle valve and a cylinder bore of the reciprocating combustion engine along a flow direction of the gaseous fuel; and
flowing the gaseous fuel into the cylinder bore of the reciprocating combustion engine via the extension tube.

* * * * *